Oct. 21, 1969  G. I. BOYADJIEFF  3,473,545
FLUID PRESSURE REGULATOR
Filed March 20, 1967  2 Sheets-Sheet 1

INVENTOR.
George I. Boyadjieff
BY
Richard T. Seeger
ATTORNEY

Oct. 21, 1969  G. I. BOYADJIEFF  3,473,545
FLUID PRESSURE REGULATOR
Filed March 20, 1967  2 Sheets-Sheet 2

INVENTOR.
George I. Boyadjieff
BY
Richard J. Seeger
ATTORNEY.

United States Patent Office 3,473,545
Patented Oct. 21, 1969

3,473,545
FLUID PRESSURE REGULATOR
George I. Boyadjieff, Pontiac, Mich., assignor to The Bendix Corporation, a corporation of Delaware
Filed Mar. 20, 1967, Ser. No. 624,553
Int. Cl. F15c 1/08, 1/12, 1/14
U.S. Cl. 137—81.5        7 Claims

ABSTRACT OF THE DISCLOSURE

A fluid pressure regulator incorporating pure fluid control devices such as pure fluid amplifiers with a responding device to achieve a regulated fluid pressure. In the preferred embodiment, two pure fluid amplifiers are used in combination with a spring loaded poppet valve in a feedback circuit to achieve the pressure regulation.

CROSS-REFERENCE TO RELATED APPLICATIONS

U.S. Ser. No. 537,861, filed Mar. 28, 1966, by Endre A. Mayer, entitled "Fluid Amplifier."

BACKGROUND OF THE INVENTION

The field of invention concerns fluid pressure regulators utilizing pure fluid amplifiers. Prior art fluid regulators are complex, expensive, devices having the following disadvantages: low reliability, relatively wide range of pressure fluctuations of the regulated pressure, relatively frequent maintenance requirements and adjustments.

SUMMARY OF THE INVENTION

This invention teaches the use of a pure fluid amplifier device in combination with a simple maintenance free attenuating member such as a spring loaded valve to provide very accurate pressure regulation in a very simple, durable, maintenance free, low cost device.

This invention utilizes a pure fluid amplifier having an inlet, exhaust and control port in combination with means for variably attenuating the supply pressure to the pressure regulator device. The attenuated supply pressure is connected to the inlet of the pure fluid amplifier and the exhaust of the pure fluid amplifier is responsive to the attenuated supply pressure. The control port of the pure fluid amplifier is connected to the regulated pressure and therefore the exhaust pressure of the pure fluid amplifier will have an amplified response corresponding to the regulated pressure variations. The exhaust pressure of the pure fluid amplifier is connected to the variable attenuating means to increase the attenuation of the supply pressure when the regulated pressure decreases and to decrease the attenuation of the supply pressure when the regulated pressure increases. In the preferred embodiment, a second pure fluid amplifier is placed in combination with the first fluid amplifier to increase the response and achieve superior regulation accuracy.

DESCRIPTION OF THE PREFERRED EMBODIMENT

Figure 1:
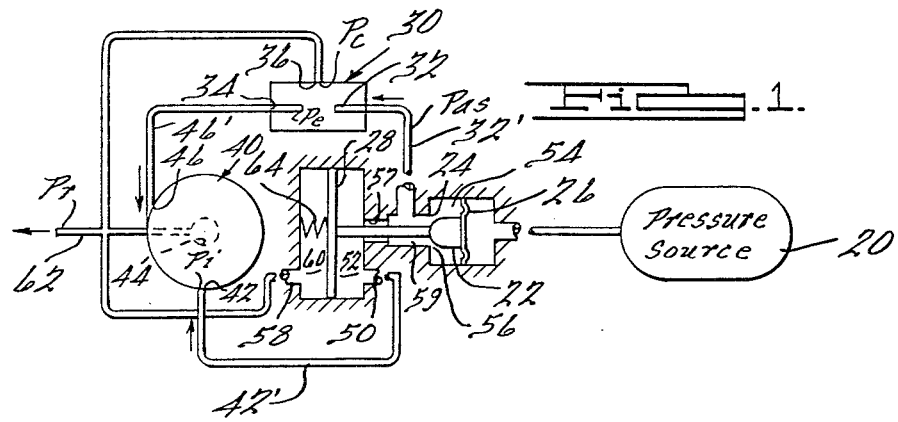
FIGURE 1 is a schematic of a preferred embodiment of this invention utilizing two pure fluid amplifiers in a fluid pressure regulation circuit.

In the schematic of FIGURE 1 is shown a variable pressure source 20 which could be a bottle of compressed gas having a steadily decreasing pressure as the gas is used therefrom. The source pressure $P_s$ is connected to a housing in which a poppet valve 22 cooperates with a seat 24 and is suspended and supported by ventilated disc 26 and solid spring disc 28. Spring disc 28 has a spring action in the axial direction and spring supports poppet 22 at a given distance from seat 24 with poppet 22 being movable toward and away from annular seat 24 but without contacting seat 24 so that $P_s$ is attenuated in proportion to the position of poppet 22 but is not cut off by poppet 22.

Figure 2:
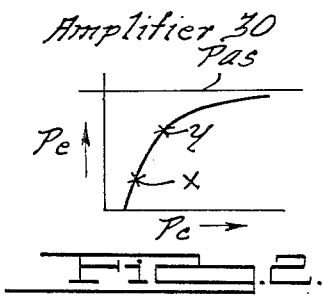
FIGURE 2 is a curve showing the relation of the exhaust pressure $P_e$ and control pressure $P_c$ for a given supply pressure $P_{as}$ in the first fluid amplifier.

A jet pressurization amplifier 30 of the kind disclosed in copending application Ser. No. 537,861, filed Mar. 28, 1966, by Endre A. Mayer, has an inlet 32, an exhaust 34, and a control port 36. The response curve for a pure fluid amplifier of this type is shown in FIGURE 2 with the exhaust pressure $P_e$ being plotted along the ordinate and the control pressure $P_c$ being plotted along the abscissa. It is seen that the $P_e$–$P_c$ relationship is substantially linear between points X and Y on the curve. For each $P_{as}$, which is the supply pressure in inlet 32, there is a corresponding $P_e$–$P_c$ curve.

Figure 3:
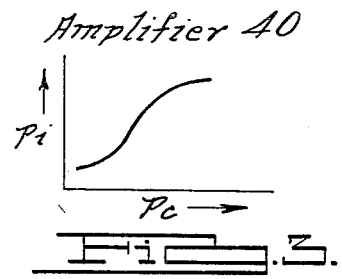
FIGURE 3 is a curve showing the relationship between the inlet pressure $P_i$ and control pressure $P_c$ for a given exhaust pressure of the second fluid amplifier.

A second pure fluid amplifier 40, which is a vortex fluid amplifier well known in the art, has an inlet 42, an exhaust 44, and a control port 46. The operation curve for the amplifier 40 is shown in FIGURE 3 with input pressure $P_i$ being plotted along the ordinate and control pressure $P_c$ being plotted along the abscissa for a given exhaust pressure.

A port 50 to chamber 52 communicates with inlet 42 of amplifier 40. The pressure in chamber 52 is the same as the pressure at inlet 42. A fraction of the attenuated supply pressure $P_{as}$ as determined by a meter passage 57 between chambers 59 and 52 supplies this pressure. Pressure $P_{as}$ is supplied to chamber 59 between valve 22 and seat 24.

Chamber 59 is also connected to the inlet 32 of amplifier 30, thereby supplying attenuated supply pressure $P_{as}$ to amplifier 30. Port 58 to chamber 60, which is on the opposite side of disc 28 from chamber 52, is connected to the exhaust 44 of amplifier 40 and also the control port 36 of amplifier 30 and further to the output 62, at which the regulated pressure $P_r$ is present. A preload spring 64 in chamber 60 biases disc 28, and hence valve 22, to the right to give a predetermined opening between valve 22 and annulus 24. The value of the regulated pressure $P_r$ may be adjusted by adjusting the preload on spring 64.

OPERATION

As $P_r$, the regulated pressure increases, the control pressure $P_c$ at port 36 of amplifier 30 also increases the exhaust pressure at exhaust 34 and the control pressure at control port 46 of amplifier 40, as may be seen with the aid of the curve in FIGURE 2. Since the exhaust pressure at exhaust 44 of amplifier 40 is tied to the regulated pressure $P_r$, changes in the pressure at control port 46 will result in changing the inlet pressure $P_i$ at port 42 in the manner shown in the curve of FIGURE 3. An increase in the control pressure at control port 46 will increase the pressure at inlet 42 which will also increase the pressure in chamber 52 moving disc 28 to the left closing the distance between valve 22 and annulus 24 thereby decreasing or attenuating the flow to the inlet 32 of amplifier 30 and inlet 42 of amplifier 40. The flow to output 62 will be reduced which will lower the regulated pressure $P_r$ correcting for the increase.

If there is a decrease in regulated pressure $P_r$, this will lower the pressure to control port 36, which will in an amplified manner lower the exhaust pressure $P_e$ at exhaust 34 and also lower the pressure to control port 46 of amplifier 40. This will lower the inlet pressure at inlet 42 of amplifier 40 lowering the pressure in chamber 52 so that the disc 28 and valve 22 will move to the right decreasing the attenuation of the supply flow and increasing the flow to output 62 which will increase the regulated pressure $P_r$ to correct for the initial pressure decrease.

While a preferred embodiment has been shown, this invention is operable with just one fluid amplifier and its connections and a supply pressure attenuating means. This is possible by removing amplifier 40 and by connecting exhaust port 34 of amplifier 30 to chamber 52 with the other connections remaining as they are. The amplifier 30 may be located externally of the valve body so that an external control may be impressed upon the regulated pressure $P_r$.

Also, other valve arrangements may be subtsituted for valve 22 and disc 28 as will be understood in the art.

A further advantage of this circuit is its high efficiencies since all of the flow from the pressure source 20 passes through the output 62 to the load.

Figure 4:
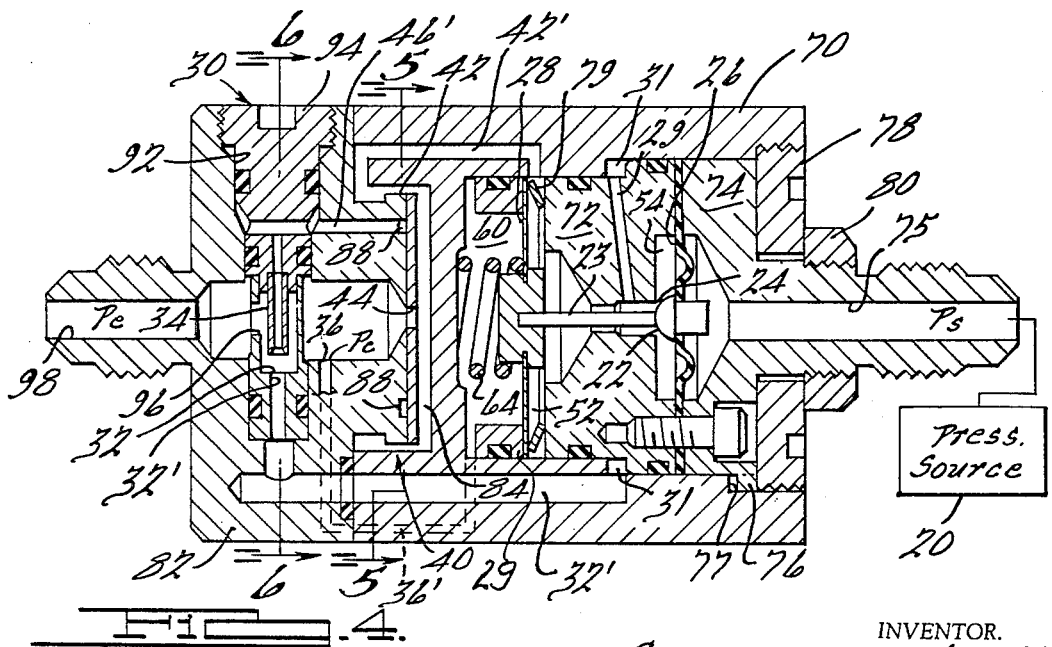
FIGURE 4 is a sectional view of a fabricated embodiment of this invention corresponding with the schematic of FIGURE 1.
Figure 5:
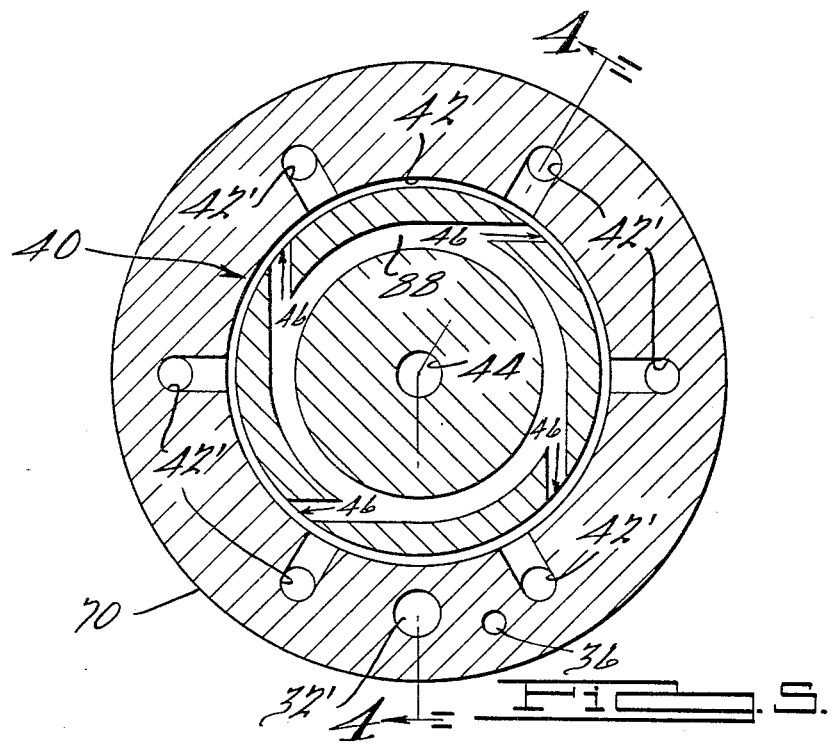
FIGURE 5 is a section taken at 5—5 of FIGURE 4 and shows the vortex amplifier.
Figure 6:
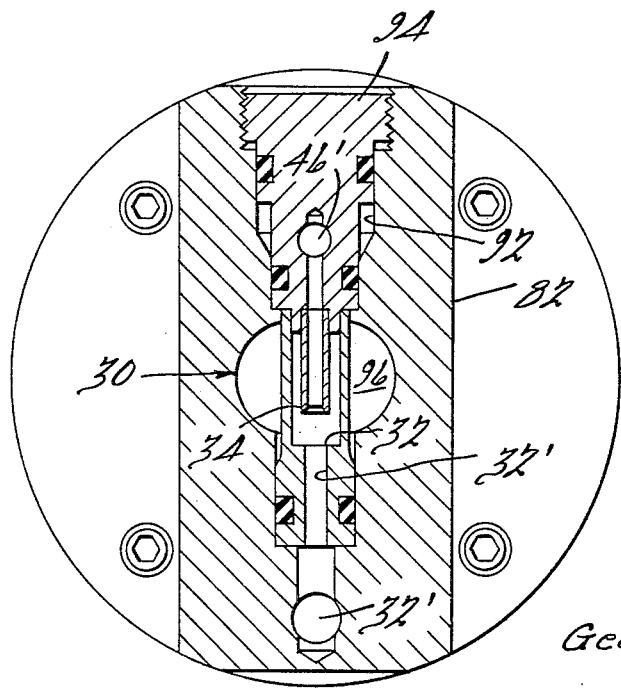
FIGURE 6 is a section taken at 6—6 of FIGURE 4 and shows the proportional amplifier.

The detailed diagram shown in FIGURES 4–6 is one method of fabricating the schematic shown in FIGURE 1 and comparable portions carry the same reference numerals.

Shown in FIGURE 4 is housing 70 which has slideable therein annulus 29 which carries disc 28. A spring 64 urges disc 28 and annulus 29 rightwardly. Chamber 60 is formed between disc 28 and housing 70.

Cylinder 72 is slideably mounted in housing 70 and has bolted thereto cylinder 74 which has axial passage 75 formed therein. Ventilated disc 26 holds poppet 22 centrally thereof and is held at its perimeter between slideable cylinders 72, 74. Key 76 is formed on cylinder 74 and slides in slot 77 which is formed in housing 70 thereby preventing cylinders 72, 74 from rotating. A spanner nut 78 is in threaded engagement with housing 70 and moves cylinders 72 and 74 against washer spring 79. Movement of cylinders 72, 74 rightwardly will decrease the load on spring 64 and movement of cylinders 72, 74 leftwardly will incearse the load on spring 64. Increasing the load on spring 64 will increase the regulated pressure and decreasing the load thereon will decrease the regulated pressure. Lock nut 80 is tightened against spanner nut 78 after the desired adjustment is obtained.

A plug 82 is inserted in the left end of housing 70 and is spaced therefrom in the central portion to form a chamber 84 and an input annulus 42 which is fed by ports 42' (FIGURE 5). A control annulus 88, also shown in FIGURE 5, is formed in plug 82 and feeds jets 46. Jets 46 force fluid into annulus 42 with a velocity having a tangential component to cause a swirl in annulus 42 to provide the vortex action. The output of vortical flow is at center passage 44. The elements thus described form the vortex amplifier shown schematically in FIGURE 1 at 40.

Amplifier 30 is shown in section in FIGURE 6. A transverse passage 92 is formed in plug 82 and insert 94 is placed therein. Chamber 96 is formed in insert 94 and has disposed therein tube 34. Chamber 96 communicates with axial output passage 98. Control port 36 communicates with chamber 96 and axial passage 98.

In the operation of the embodiment shown in FIGURES 4–6, as the regulated pressure $P_r$ increases, the control pressure $P_c$ at port 36 of amplifier 30 also increases which increases the exhaust pressure at exhaust 34. This increases the control pressure at control jets 46 of amplifier 40 since exhaust 34 is connected to annulus 88 by means of passage 46'. Annulus 88 is connected to and supplies fluid to control jets 46 as may be seen in FIGURE 5.

A change in the control pressure at control jets 46 will result in changing the inlet pressure at inlet annulus 42 in the manner shown in the curve of FIGURE 3. The increase of pressure at inlet 42 will also increase the pressure in chamber 52 since inlet annulus 42 is connected to chamber 52 by passages 42'. This will move disc 28 to the left closing the distance between valve 22 and annular seat 24 thereby decreasing or attenuating the flow to inlet 32 of amplifier 30 and to inlet 42 of amplifier 40. Chamber 54, in which poppet valve 22 reciprocates, is connected to inlet 32 through radial passage 29, annulus 31 and passage 32'. This in turn will cause the flow to output 98 to be reduced and will lower the regulated pressure $P_r$ thereby correcting for the increase.

If there is a decrease in regulated pressure $P_r$, the pressure to control port 36 will be lowered which will lower the exhaust pressure $P_e$ at exhaust 34 and also lower the pressure to control jets 46 of amplifier 40. This will lower the inlet pressure at inlet annulus 42 amplifier 40 lowering the pressure in chamber 52 so that the disc 28 and valve 22 will move to the right decreasing the attenuation of the supply pressure and increasing the flow to amplifiers 30, 40 which will increase the flow at output 98 increasing the regulated pressure $P_r$ to correct for the initial pressure decrease.

Having thus described my invention, I claim:
1. Apparatus comprising,
a first pure fluid amplifier having an inlet, an exhaust, and control for controlling the pressure relationship between the inlet and exhaust,
a second pure fluid amplifier having an inlet, exhaust, and control for controlling the pressure relationship between the inlet and the exhaust,
supply pressure source,
variable attenuating means for attenuating the supply flow from the supply pressure source,
the attenuated supply flow being connected to the inlet of the first fluid amplifier,
a regulated pressure port,
the regulated pressure port being connected to the control of the first fluid amplifier whereby the exhaust pressure of the first fluid amplifier will vary in amplified proportion to the variations in regulated pressure,
the exhaust of the first fluid amplifier being connected to the control of the second fluid amplifier and the exhaust of the second fluid amplifier being connected to the regulated pressure port and therefore the exhaust pressure of the second fluid amplifier will be equal to the regulated pressure,
the inlet of said second fluid amplifier being connected to said attenuating means to control the degree of attenuation of said attenuating means so that the inlet flow to the first fluid amplifier will be decreased when the regulated pressure increases and the inlet flow to the first fluid amplifier will be increased when the regulated pressure decreases.
2. Pressure regulator comprising:
fluid supply source,
regulated pressure means,
fluid device means having input, output and control ports with the control pressure at the control port having a predetermined relation to the pressures at the input and output ports,
said input port being connected to said supply source,
the regulated pressure means being connected to said fluid device means control port,
said fluid device means control pressure being responsive to changes in the regulated pressure,
responding means having a movable member responsive to the fluid device means output pressure to vary the flow at the fluid device input in a manner to bring the pressure in the regulated pressure means to a predetermined level, second fluid device means being responsive to and amplifying the pressure changes at the output port of the fluid device means to provide an amplified signal to said responsive means, said second fluid device means having an input port, output port, and control port, the output port of the fluid device means being connected to the control port of the second fluid amplifier, the regulated pressure means being connected to the output port of the second fluid device means and said movable member being connected to the input port of the second fluid device means to move said movable member in a manner to vary the flow at the input of said fluid device means to keep the pressure at the regulated pressure means at the predetermined level, said responding means comprising a disc movable in a chamber, one side of said disc being subject to a combination of a portion of the supply pressure and the pressure at the supply port of the second fluid device means and the other side of said disc being subject to the regulated pressure, whereby changing flow from said fluid supply source by said responding means will correspondingly change flow to the input ports of the fluid device means and the second fluid device means.

3. A fluid pressure regulator for maintaining an output flow at a preselected pressure comprising:
a regulator input;
valve means connected to said input for varying the fluid flow at said input;
a regulator output;
a closed flow line connecting said input and output of the regulator;
a jet pressurization amplifier constructed to form a portion of said closed flow line, said amplifier having an input port connected to the regulator input, a control port adapted to exit a major portion of the fluid entering said amplifier and to set the pressure level within said amplifier, and an exhaust port placed opposite to and axially aligned with said intake port so that pressure fluctuations at said control port appear in magnified proportion at said exhaust port; and
means connecting said exhaust port with said valve means to provide a feedback control of said valve.

4. The combination of claim 3 in which said valve means comprises a movable member disposed within a housing chamber and said means connecting said exhaust port with said valve means directs fluid from said exhaust port into one side of said chamber to move said movable member to close said valve as said exhaust pressure increases.

5. The combination of claim 4 further including a closed flow line for directing fluid from said control port to the opposite side of said housing chamber so that the pressure acting on said movable member to oppose the force of fluid from said exhaust port will be independent of atmospheric pressure.

6. The combination of claim 4 in which said means connecting said exhaust port with said valve means includes a second fluid amplifier for providing an amplified signal of pressure variations at said exhaust port to said valve means, said second amplifier having inlet, control, and exhaust ports with said exhaust port of said second amplifier connected to said regulator output.

7. A fluid pressure regulator for rapidly correcting pressure fluctuations in a flow line to maintain an output flow at a preselected pressure comprising:
a regulator input adapted to be connected to a fluid supply pressure source;
a regulator output;
valve means connected to said input for varying the flow of fluid at said input;
a confined flow passageway connecting said input and said output; and
fluid amplifier means having an input port and a control port constructed to form a portion of said confined flow passageway, and an exhaust port adapted to provide a feedback signal to said valve means having pressure variations corresponding to but greater than the pressure variations at said regulator output.

References Cited

UNITED STATES PATENTS

| 2,727,525 | 12/1955 | Harris | 137—81.5 XR |
| 2,964,051 | 12/1960 | Garnett | 137—85 |
| 2,974,674 | 3/1961 | Baldridge | 137—85 |
| 2,985,183 | 5/1961 | Peatross | 137—86 |
| 3,276,259 | 10/1966 | Bowles et al. | 137—81.5 XR |
| 3,279,489 | 10/1966 | Bjornsen et al. | 137—81.5 |
| 3,378,022 | 4/1968 | Sorenson | 137—81.5 |

SAMUEL SCOTT, Primary Examiner